United States Patent
Jones et al.

(10) Patent No.: US 11,440,097 B2
(45) Date of Patent: Sep. 13, 2022

(54) METHODS FOR ADDITIVELY MANUFACTURING COMPONENTS USING LATTICE SUPPORT STRUCTURES

(71) Applicant: General Electric Company, Schenectady, NY (US)

(72) Inventors: Ryan Christopher Jones, Cincinnati, OH (US); Jun Zheng Hu, Cincinnati, OH (US); John Alan Manteiga, North Andover, MA (US); Xuefeng Zhang, Mason, OH (US); Earl Neal Dunham, Hamilton, OH (US); Paul Christopher Schilling, Waynesville, OH (US); Johnnattan Tennessee Ugarte, Mason, OH (US); Justin Michael Stekli, Dayton, OH (US); Justin Adam Masters, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 472 days.

(21) Appl. No.: 16/273,474

(22) Filed: Feb. 12, 2019

(65) Prior Publication Data
US 2020/0254519 A1    Aug. 13, 2020

(51) Int. Cl.
*B29C 64/153*    (2017.01)
*B29C 64/40*    (2017.01)
(Continued)

(52) U.S. Cl.
CPC ............ *B22F 10/20* (2021.01); *B22F 3/1115* (2013.01); *B22F 3/24* (2013.01); *B22F 10/47* (2021.01);
(Continued)

(58) Field of Classification Search
CPC .................................. B22F 10/47; B22F 10/62
See application file for complete search history.

(56) References Cited

U.S. PATENT DOCUMENTS

| 2,957,608 A | 10/1960 | Wahl |
| 3,791,558 A | 2/1974 | Katusha |

(Continued)

FOREIGN PATENT DOCUMENTS

| CN | 205414417 U | 8/2016 |
| DE | 19954891 A1 † | 5/2001 |

(Continued)

OTHER PUBLICATIONS

Aremu, Adeyemi Oladapo, et al. "A voxel-based method of constructing and skinning conformal and functionally graded lattice structures suitable for additive manufacturing." Additive Manufacturing 13 (2017): 1-13. (Year: 2017).*

(Continued)

*Primary Examiner* — Anthony J Zimmer
*Assistant Examiner* — Sean P. O'Keefe
(74) *Attorney, Agent, or Firm* — Dinsmore & Shohl LLP

(57) ABSTRACT

A method for additively manufacturing a component includes generating, via imaging software, a plurality of slices of a support structure of the component based on component geometry. The method also includes melting or fusing, via the additive manufacturing system, layers of material to a build platform of the component so as to form the support structure according to the plurality of slices. The support structure includes a lattice configuration having of a plurality of support members arranged together to form a plurality of cells. Further, the method includes melting or fusing, via the additive manufacturing system, a component body to the support structure. After the component body solidifies, the method includes removing all of the support structure from the component body to form the component.

15 Claims, 5 Drawing Sheets

(51) Int. Cl.
  *B22F 3/24* (2006.01)
  *B22F 10/80* (2021.01)
  *B22F 10/47* (2021.01)
  *B22F 10/66* (2021.01)
  *B22F 10/62* (2021.01)
  *B22F 3/11* (2006.01)
  *B33Y 10/00* (2015.01)
  *B33Y 40/00* (2020.01)
  *B33Y 50/02* (2015.01)
  *B22F 10/20* (2021.01)
  *B29C 64/393* (2017.01)
  *B22F 10/30* (2021.01)

(52) U.S. Cl.
  CPC .............. *B22F 10/62* (2021.01); *B22F 10/66* (2021.01); *B22F 10/80* (2021.01); *B29C 64/153* (2017.08); *B29C 64/393* (2017.08); *B29C 64/40* (2017.08); *B22F 10/30* (2021.01); *B22F 2003/241* (2013.01); *B33Y 10/00* (2014.12); *B33Y 40/00* (2014.12); *B33Y 50/02* (2014.12)

(56) References Cited

U.S. PATENT DOCUMENTS

| | | | |
|---|---|---|---|
| 4,450,983 A | 5/1984 | Goodrich | |
| 4,863,538 A | 9/1989 | Deckard | |
| 4,899,993 A | 2/1990 | Habermann et al. | |
| 4,938,816 A | 7/1990 | Beaman et al. | |
| 5,460,758 A | 10/1995 | Langer et al. | |
| 5,529,471 A | 6/1996 | Khoshevis | |
| 5,545,367 A | 8/1996 | Bae et al. | |
| 5,595,703 A | 1/1997 | Swaelens et al. | |
| 5,598,340 A | 1/1997 | Medard et al. | |
| 5,656,230 A | 8/1997 | Khoshevis | |
| 5,837,960 A | 11/1998 | Lewis et al. | |
| 5,897,825 A | 4/1999 | Fruth et al. | |
| 6,042,774 A | 3/2000 | Wilkening et al. | |
| 6,209,758 B1 | 4/2001 | Arslanouk et al. | |
| 6,215,093 B1 | 4/2001 | Meiners et al. | |
| 6,308,922 B1 | 10/2001 | Hollington et al. | |
| 6,309,581 B1 | 10/2001 | Gervasi | |
| 6,341,952 B2 | 1/2002 | Gaylo et al. | |
| 6,460,595 B1 | 10/2002 | Benz et al. | |
| 6,471,800 B2 | 10/2002 | Jang et al. | |
| 6,554,600 B1 | 4/2003 | Hofmann et al. | |
| 6,925,346 B1 | 8/2005 | Mazumder et al. | |
| 6,936,212 B1 | 8/2005 | Crawford | |
| 6,995,334 B1 | 2/2006 | Kovacevic et al. | |
| 7,381,921 B2 | 6/2008 | Hagemeister et al. | |
| 7,435,072 B2 | 10/2008 | Collins et al. | |
| 7,506,593 B2 | 3/2009 | Strabel, III | |
| 7,625,522 B2 | 12/2009 | Cooper | |
| 7,713,454 B2 | 5/2010 | Larsson | |
| 7,828,022 B2 | 11/2010 | Davidson et al. | |
| 7,887,316 B2 | 2/2011 | Cox | |
| 8,021,138 B2 | 9/2011 | Green | |
| 8,046,097 B2 | 10/2011 | Hull et al. | |
| 8,070,474 B2 | 12/2011 | Abe et al. | |
| 8,110,135 B2 | 2/2012 | El-Siblani | |
| 8,155,775 B2 | 4/2012 | Batchelder | |
| 8,393,497 B2 | 3/2013 | Fontaine et al. | |
| 8,459,280 B2 | 6/2013 | Swanson et al. | |
| 8,470,234 B2 | 6/2013 | Clark | |
| 8,505,560 B2 | 8/2013 | Tafoya | |
| 8,506,836 B2 | 8/2013 | Szuromi et al. | |
| 8,640,531 B2 | 2/2014 | Remillard et al. | |
| 8,684,069 B2 | 4/2014 | Mottin et al. | |
| 8,691,333 B2 | 4/2014 | Godfrey et al. | |
| 8,828,311 B2 | 9/2014 | Medina et al. | |
| 9,022,063 B2 | 5/2015 | Powell | |
| 9,183,325 B2 | 11/2015 | Wighton et al. | |
| 9,188,341 B2 | 11/2015 | McMasters et al. | |
| 9,283,716 B2 | 3/2016 | Swanson et al. | |
| 9,327,451 B2 | 5/2016 | Teulet | |
| 9,636,869 B2 | 5/2017 | Kroll et al. | |
| 9,636,872 B2 | 5/2017 | Batchelder | |
| 9,764,423 B2 | 9/2017 | Hoebel et al. | |
| 9,767,224 B2 | 9/2017 | Chou et al. | |
| 9,808,865 B2 | 11/2017 | Rogers | |
| 9,823,143 B2 | 11/2017 | Twelves, Jr. et al. | |
| 9,915,480 B2 | 3/2018 | Ott et al. | |
| 10,018,121 B2 | 7/2018 | Taylor-Tibbott | |
| 10,040,115 B2 | 8/2018 | Slavens et al. | |
| 10,100,168 B2 | 10/2018 | Bayer et al. | |
| 10,124,408 B2 | 11/2018 | Kenney et al. | |
| 10,124,540 B2 | 11/2018 | Ooba et al. | |
| 2002/0062909 A1 | 5/2002 | Jang et al. | |
| 2002/0171177 A1 | 11/2002 | Kritchman et al. | |
| 2004/0084814 A1 | 5/2004 | Boyd et al. | |
| 2006/0118532 A1 | 6/2006 | Chung et al. | |
| 2007/0029693 A1 | 2/2007 | Wigand et al. | |
| 2007/0295440 A1 | 12/2007 | Stucker et al. | |
| 2008/0175424 A1 | 7/2008 | McBagonluri et al. | |
| 2008/0302056 A1* | 12/2008 | Daas ...................... E04C 3/005 52/685 |
| 2009/0039570 A1 | 2/2009 | Clark | |
| 2009/0255264 A1 | 10/2009 | McMasters et al. | |
| 2010/0078022 A1 | 4/2010 | Striebig et al. | |
| 2011/0223349 A1 | 9/2011 | Scott | |
| 2011/0247590 A1 | 10/2011 | Donovan | |
| 2011/0250087 A1 | 10/2011 | Sagawa | |
| 2011/0278773 A1 | 11/2011 | Bokodi et al. | |
| 2012/0018926 A1 | 1/2012 | Mannella et al. | |
| 2012/0113439 A1 | 5/2012 | Ederer | |
| 2012/0223462 A1 | 9/2012 | Eriksson et al. | |
| 2012/0258250 A1 | 10/2012 | Rodgers | |
| 2013/0071562 A1 | 3/2013 | Szuromi et al. | |
| 2013/0101746 A1 | 4/2013 | Keremes et al. | |
| 2013/0244040 A1 | 9/2013 | Oshima | |
| 2013/0264750 A1 | 10/2013 | Hofacker et al. | |
| 2013/0307193 A1 | 11/2013 | Johnson et al. | |
| 2013/0316084 A1 | 11/2013 | Szuromi et al. | |
| 2014/0010908 A1 | 1/2014 | Matsumoto et al. | |
| 2014/0052287 A1 | 2/2014 | Swanson et al. | |
| 2014/0077422 A1 | 3/2014 | Minick | |
| 2014/0092918 A1 | 4/2014 | Jost | |
| 2014/0195001 A1 | 7/2014 | Grohowski, Jr. | |
| 2014/0251481 A1 | 9/2014 | Kroll et al. | |
| 2014/0252684 A1 | 9/2014 | Swanson et al. | |
| 2014/0277669 A1 | 9/2014 | Nardi et al. | |
| 2014/0303942 A1 | 10/2014 | Wighton et al. | |
| 2014/0335313 A1 | 11/2014 | Chou et al. | |
| 2014/0348969 A1 | 11/2014 | Scott | |
| 2014/0358273 A1 | 12/2014 | LaBossiere et al. | |
| 2014/0367367 A1* | 12/2014 | Wood ................ B23K 15/0086 219/76.12 |
| 2015/0001093 A1 | 1/2015 | Carter et al. | |
| 2015/0021379 A1 | 1/2015 | Albrecht et al. | |
| 2015/0048209 A1 | 2/2015 | Hoyt et al. | |
| 2015/0061190 A1 | 3/2015 | Yakubov et al. | |
| 2015/0088295 A1 | 3/2015 | Hellestam | |
| 2015/0093283 A1 | 4/2015 | Miller et al. | |
| 2015/0104326 A1 | 4/2015 | Waldman et al. | |
| 2015/0174695 A1 | 6/2015 | Elfstroem et al. | |
| 2015/0176500 A1 | 6/2015 | Taylor-Tibbott | |
| 2015/0190971 A1 | 7/2015 | Musuvathy et al. | |
| 2015/0193559 A1* | 7/2015 | Musuvathy ........... B29C 64/386 703/1 |
| 2015/0197862 A1† | 7/2015 | Engel | |
| 2015/0231827 A1 | 8/2015 | Uzan et al. | |
| 2015/0251249 A1 | 9/2015 | Fager | |
| 2015/0258609 A1 | 9/2015 | Teulet | |
| 2015/0267543 A1 | 9/2015 | Gerber et al. | |
| 2015/0360421 A1 | 12/2015 | Burhop et al. | |
| 2016/0009039 A1 | 1/2016 | Blanchet | |
| 2016/0052057 A1 | 2/2016 | Xu | |
| 2016/0052205 A1 | 2/2016 | FrantzDale | |
| 2016/0059314 A1 | 3/2016 | Ljungblad et al. | |
| 2016/0075059 A1 | 3/2016 | Williams | |
| 2016/0096945 A1 | 4/2016 | Farmer et al. | |
| 2016/0107234 A1 | 4/2016 | Craeghs et al. | |

(56) References Cited

U.S. PATENT DOCUMENTS

| | | |
|---|---|---|
| 2016/0107390 A1 | 4/2016 | Davis et al. |
| 2016/0121389 A1 | 5/2016 | Slavens et al. |
| 2016/0129502 A1 | 5/2016 | Varetti |
| 2016/0144428 A1 | 5/2016 | Mironets et al. |
| 2016/0158962 A1 | 6/2016 | Balistreri et al. |
| 2016/0175932 A1 | 6/2016 | Dimter et al. |
| 2016/0175934 A1 | 6/2016 | Lacy et al. |
| 2016/0177834 A1 | 6/2016 | Patel et al. |
| 2016/0193696 A1 | 7/2016 | McFarland et al. |
| 2016/0207260 A1 | 7/2016 | Lee et al. |
| 2016/0221264 A1 | 8/2016 | Doherty et al. |
| 2016/0222791 A1 | 8/2016 | Rogers |
| 2016/0229127 A1 | 8/2016 | Halliday et al. |
| 2016/0236277 A1 | 8/2016 | Doherty et al. |
| 2016/0238324 A1 | 8/2016 | Butcher et al. |
| 2016/0243620 A1 | 8/2016 | Butcher |
| 2016/0243644 A1 | 8/2016 | Moneta et al. |
| 2016/0263838 A1 | 9/2016 | Goldman et al. |
| 2016/0271699 A1 | 9/2016 | Illston |
| 2016/0319678 A1 | 11/2016 | Staroselsky et al. |
| 2016/0325503 A1 | 11/2016 | Mironets et al. |
| 2016/0332251 A1 | 11/2016 | Bunker et al. |
| 2016/0332371 A1 | 11/2016 | Staroselsky et al. |
| 2016/0346896 A1 | 12/2016 | Tian et al. |
| 2016/0348913 A1 | 12/2016 | Ott et al. |
| 2016/0368224 A1 | 12/2016 | Ooba et al. |
| 2016/0370791 A1 | 12/2016 | Revanur et al. |
| 2016/0375489 A1 | 12/2016 | Marchione |
| 2017/0003029 A1 | 1/2017 | Mook et al. |
| 2017/0066083 A1 | 3/2017 | Shioya et al. |
| 2017/0120536 A1 | 5/2017 | Brunermer et al. |
| 2017/0136539 A1 | 5/2017 | Chou et al. |
| 2017/0184086 A1* | 6/2017 | Scancarello ............ F04B 39/02 |
| 2017/0203365 A1 | 7/2017 | Pays et al. |
| 2017/0232511 A1 | 8/2017 | Fieldman et al. |
| 2017/0232512 A1 | 8/2017 | Joerger |
| 2017/0232670 A1 | 8/2017 | Joerger et al. |
| 2017/0232671 A1 | 8/2017 | Fieldman |
| 2017/0232672 A1 | 8/2017 | Fieldman et al. |
| 2017/0232682 A1 | 8/2017 | Alcantara Marte et al. |
| 2017/0232683 A1 | 8/2017 | Alcantara Marte et al. |
| 2017/0326815 A1 | 11/2017 | Stevenson et al. |
| 2018/0001384 A1 | 1/2018 | Manteiga et al. |
| 2018/0029123 A1 | 2/2018 | Gubelmann et al. |
| 2018/0029306 A1 | 2/2018 | Gold et al. |
| 2018/0056594 A1 | 3/2018 | Sterenthal et al. |
| 2018/0099454 A1 | 4/2018 | Hummeler et al. |
| 2018/0111334 A1 | 4/2018 | Gold et al. |
| 2018/0141122 A1 | 5/2018 | Fieldman et al. |
| 2018/0147798 A1 | 5/2018 | Kolandaivelu |
| 2018/0154441 A1 | 6/2018 | Miller et al. |
| 2018/0169756 A1 | 6/2018 | Palys |
| 2018/0169757 A1* | 6/2018 | Murao .................... B33Y 50/02 |
| 2018/0319077 A1 | 11/2018 | Blanchet et al. |
| 2018/0333777 A1 | 11/2018 | Bautista et al. |
| 2018/0356794 A1 | 12/2018 | Wiedenhoefer et al. |
| 2019/0314895 A1* | 10/2019 | Hildreth .................... C25F 3/08 |
| 2021/0146448 A1* | 5/2021 | Fujita .................... B33Y 80/00 |

FOREIGN PATENT DOCUMENTS

| | | |
|---|---|---|
| DE | 102012008664 A1 | 11/2013 |
| EP | 2191922 A1 | 6/2010 |
| EP | 2447046 A2 | 5/2012 |
| EP | 2963347 A1 | 7/2015 |
| EP | 3053720 A1 | 8/2016 |
| GB | 2479616 A | 10/2011 |
| JP | H09216290 A | 8/1997 |
| JP | 2000336403 A | 12/2000 |
| JP | 2013194263 A | 9/2013 |
| JP | 2015107653 A | 6/2015 |
| KR | 101628944 B1 | 6/2016 |
| WO | WO2010/082331 A1 | 7/2010 |

OTHER PUBLICATIONS

European Extended Search Report for EP Application No. 20154755.1 dated Jul. 2, 2020 (9 pages).

Vaidya, et al., "Optimum Support Structure Generation for Additive Manufacturing using Unit Cell Structures and Support Removal Constraint", vol. 5, Jan. 2016, pp. 1043-1059, Elsevier B.V., XP-002783386.

U.S. Appl. No. 15/643,167, filed Jul. 6, 2017.

U.S. Appl. No. 15/702,040, filed Sep. 12, 2017.

Carter, Jr., et al., Direct Laser Sintering of Metals, Texas Scholar Works, 1993 International Solid Freeform Fabrication Symposium, 1993, pp. 51-59. https://repositories.lib.utexas.edu/bitstream/handle/2152/65036/1993-05-Carter.pdf http://hdl.handle.net/2152/65036.

Christensen et al., Distribution of Temperatures in Arc Welding, British Welding Journal, vol. 12, No. 2, Feb. 1965, pp. 54-75.

Cooper et al., Contact-Free Support Structures for Part Overhangs in Powder-Bed Metal Additive Manufacturing, Rapid Conference and Exposition, MDPI, Journal, Inventions, vol. 3, Issue 2, 2018, pp. 1-11. http://dx.doi.org/10.3390/inventions3010002.

Forderhase et al., Reducing or Eliminating Curl on Wax Parts Produced in the Sinterstation 2000 System, Texas Scholar Works, 1993 International Solid Freeform Fabrication Symposium, 1993, pp. 94-101. http://hdl.handle.net/2152/65043.

Hussein et al., Advanced lattice support structures for metal additive manufacturing, Journal of Materials Processing Technology, vol. 213, Issue 7, 2013, pp. 1019-1026. https://doi.org/10.1016/j.jmatprotec.2013.01.020.

Jacobson et al., Practical Issues in the Application of Direct Metal Laser Sintering, Centre for Rapid Design and Manufacture, Buckinghamshire UK, pp. 728-739.

Langelaar, Topology optimization of 3D self-supporting structures for additive manufacturing, Additive Manufacturing, vol. 12, 2016, pp. 60-70.

Mani et al., Measurement Science Needs for Real-time Control of Additive Manufacturing Powder Bed Fusion Processes, National Institute of Standards and Technology, NISTIR 8036, Feb. 2015, 50 Pages.

Nunes, Jr., An Extended Rosenthal Weld Model, Welding Research Supplement, vol. 62, No. 6, Jun. 1983, pp. 165-s to 170-s.

Rosenthal, et al., the Theory of Moving Sources of Heat and Its Application to Metal Treatments, Transactions of the A.S.M.E., vol. 43, Nov. 1946, pp. 849-866.

Rybicki et al., A Finite-Element Model for Residual Stresses and Deflections in Girth-Butt Welded Pipes, The American Society of Mechanical Engineers, J. Pressure Vessel Technology, vol. 100, Issue 3, Aug. 1, 1978, 7 Pages. (Abstract Only).

Strano et al., A new approach to the design and optimization of support structures in additive manufacturing, International Journal of Advanced Manufacturing Technology, vol. 66, Issue 9-12, 2013, pp. 1247-1254.

Xiong et al., Bead geometry prediction for robotic GMAW-based rapid manufacturing through a neural network and a second-order regression analysis, Journal of Intelligent Manufacturing, vol. 25, Issue 1, Feb. 2014, pp. 157-163. (Abstract Only).

Chinese office action for application 202010089646.7 dated Aug. 3, 2021 (16 pages with English Translation).

China office action for application 202010089646.7 dated Feb. 28, 2022 (10 pages with English Translation).

\* cited by examiner
† cited by third party

METHODS FOR ADDITIVELY MANUFACTURING COMPONENTS USING LATTICE SUPPORT STRUCTURES

FIELD

The present disclosure relates generally to additive manufacturing and more particularly to methods for additively manufacturing components using lattice support structures.

BACKGROUND

When fabricating a component using an additive manufacturing systems such as a powder bed fusion (PBF) system, support structures may be utilized to anchor the component to a build platform and provide a thermally conductive pathway for heat to dissipate from the component. As examples, PBF systems include direct metal laser melting (DMLM) systems, electron beam melting (EBM) systems, selective laser melting (SLM) systems, directed metal laser sintering (DMLS) systems, and selective laser sintering (SLS) systems. These PBF systems involve focusing an energy beam onto a bed of powder to melt or sinter sequential layers of powder to one another to form a component. The powder undergoes rapid changes in temperature, which can create significant residual stresses in the component, the support structure, and/or the build platform. These residual stresses can cause the component and/or the build platform to warp when cooling, or for the component to break away from the support structure, or for the support structure to break away from the build platform, particularly when large temperature gradients exist within the component or the support structure.

Larger support structures may be provided to supply increased holding strength through a larger contact surface between the component and the support structure and/or the support structure and the build platform. However, for large components, larger support structures may conduct a significant amount of heat to the build platform such that the build platform may warp when cooling. In addition, larger support structures tend to require more time and energy to remove relative to smaller support structures during post fabrication processes. On the other hand, smaller support structures have less holding strength and may increase the likelihood of the component breaking away from the support structure and/or the support structure breaking away from the build platform. When the component and/or the build platform warps or breaks away from the support structure, the component may interfere with the recoater of a PBF system, causing a malfunction of the PBF system and/or an unsuccessful build.

Accordingly, there exists a need for improved methods for additively manufacturing components using lattice support structures.

BRIEF DESCRIPTION

Aspects and advantages will be set forth in part in the following description, or may be obvious from the description, or may be learned through practicing the presently disclosed subject matter.

In one aspect, the present disclosure is directed to a method for additively manufacturing a component. The method includes generating, via three-dimensional (3-D) imaging software, a plurality of slices of a support structure of the component based on component geometry. The method also includes melting or fusing, via the additive manufacturing system, layers of material to a build platform of the component so as to form the support structure and a component body according to the plurality of slices. The support structure includes a lattice configuration having of a plurality of support members arranged together to form a plurality of cells. After the support structure and the component body solidify, the method includes removing all of the support structure from the component body to form the component.

In another aspect, the present disclosure is directed to a method for additively manufacturing a component. The method includes forming, via an additive manufacturing system, a support structure and a component body of the component a build platform of the component. The support structure includes a lattice configuration having of a plurality of support members arranged together to form a plurality of cells. After the support structure and the component body solidify, the method includes detaching the support structure from the component body via chemical etching.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which.

DETAILED DESCRIPTION

Figure 1:
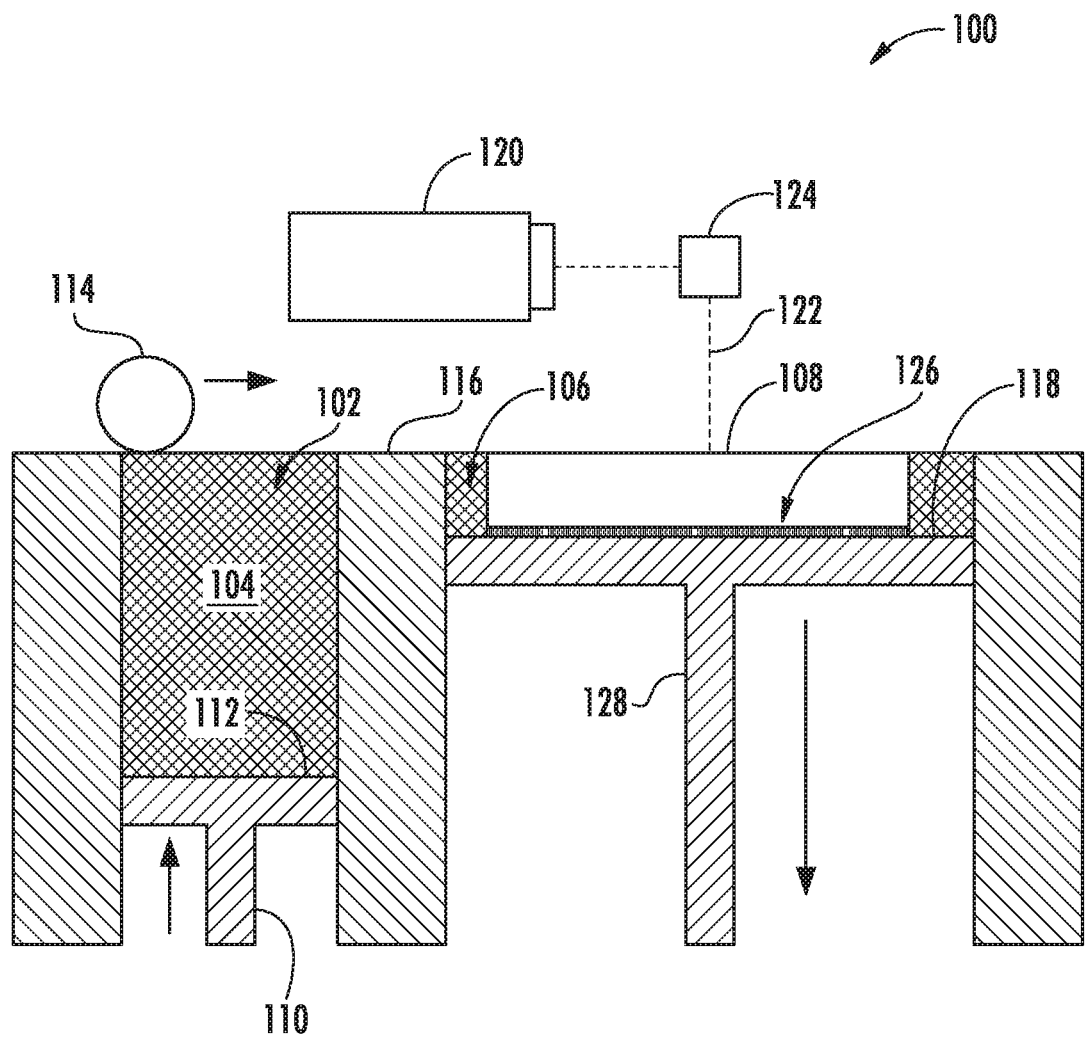
FIG. 1 illustrates a cross-sectional view of one embodiment of an additive manufacturing system according to the present disclosure.

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

Referring now to the drawings, FIG. 1 illustrates a schematic diagram of one embodiment of an additive manufacturing system 100 according the present disclosure. The additive manufacturing system 100 may include, for example, a powder bed fusion (PBF) system, such as a direct metal laser melting (DMLM) system, an electron beam melting (EBM) system, a selective laser melting (SLM) system, a directed metal laser sintering (DMLS) system, or a selective laser sintering (SLS) system. As such, the additive manufacturing system 100 builds components in a layer-by-layer manner by melting or fusing sequential layers of a powder material to one another. The illustrated additive manufacturing system 100 includes a powder supply chamber 102 that contains a supply of powder 104, and a build chamber 106 within which a component 108 may be additively manufactured in a layer-by-layer manner. For example, in certain embodiments, the component 108 may be an air-foil separator or a heat exchanger for a gas turbine engine. In further embodiments, the component 108 may be any suitable part that can benefit from additive manufacturing technology.

The powder supply chamber 102 includes a powder piston 110 which elevates a powder floor 112 during operation of the system 100. As the powder floor 112 elevates, a portion of the powder 104 is forced out of the powder supply chamber 102. A recoater 114 such as a roller or a blade pushes some of the powder 104 across a work surface 116 and onto a build platform 118. The recoater 114 sequentially distributes thin layers of powder 104 onto the build platform 118. An energy source 120 directs an energy beam 122 such as a laser or an electron beam onto the thin layer of powder 104 to melt or fuse the sequential layers of powder 104. Typically with a DMLM, EBM, or SLM system, the powder 104 is fully melted, with respective layers being melted or re-melted with respective passes of the energy beam 122. Conversely, with DMLS, or SLS systems, layers of powder 104 are sintered, fusing particles of powder 104 with one another generally without reaching the melting point of the powder 104.

A scanner 124 controls the path of the beam so as to melt or fuse only the portions of the layer of powder 104 that are to become part of the component 108. The first layer or series of layers of powder 104 are typically melted or fused to the build platform 118, and then sequential layers of powder 104 are melted or fused to one another to additively manufacture the component 108. The first several layers of powder 104 that become melted or fused to the build platform 118 define a support structure 126 for the component 108. As sequential layers of powder 104 are melted or fused to one another, a build piston 128 gradually lowers the build platform 118 so as to make room for the recoater 114 to distribute sequential layers of powder 104. Sequential layers of powder 104 may be melted or fused to the component 108 until a completed component 108 has been fabricated.

Generally, the support structure 126 provides a surface to which sequential layers of powder 104 may be melted or fused, while holding the sequential layers of melted or fused powder in position while resisting residual stresses caused by rapid changes in temperature as the energy beam 122 melts or fuses the sequential layers of powder 104. The support structure 126 also provides a thermally conductive pathway to dissipate heat generated by the energy beam 122. Typically, a support structure 126 may be fabricated in the same manner as the component 108. In some embodiments, the same powder 104 may be used to fabricate the support structure 126 and the component 108. Alternatively, in some embodiments, a different powder 104 may be used for the support structure 126 and the component 108. When forming the support structure 126, the energy beam 122 typically melts or sinters the top surface of the build platform 118 together with the first few layers of powder 104 so as to securely weld (e.g., melt or fuse) the support structure 126 to the build platform 118. After the component 108 has been fabricated, the support structure 126 may be removed from the component 108 in post-fabrication processes. For example, as will be further described herein, the component 108 may be manually removed from the support structure 126 or cut away from the support structure 126 using an electrical discharge machine (EDM) (such as a wire-cut EDM), chemical etching, a buffing tool, or any other suitable cutting tool.

Figure 2:
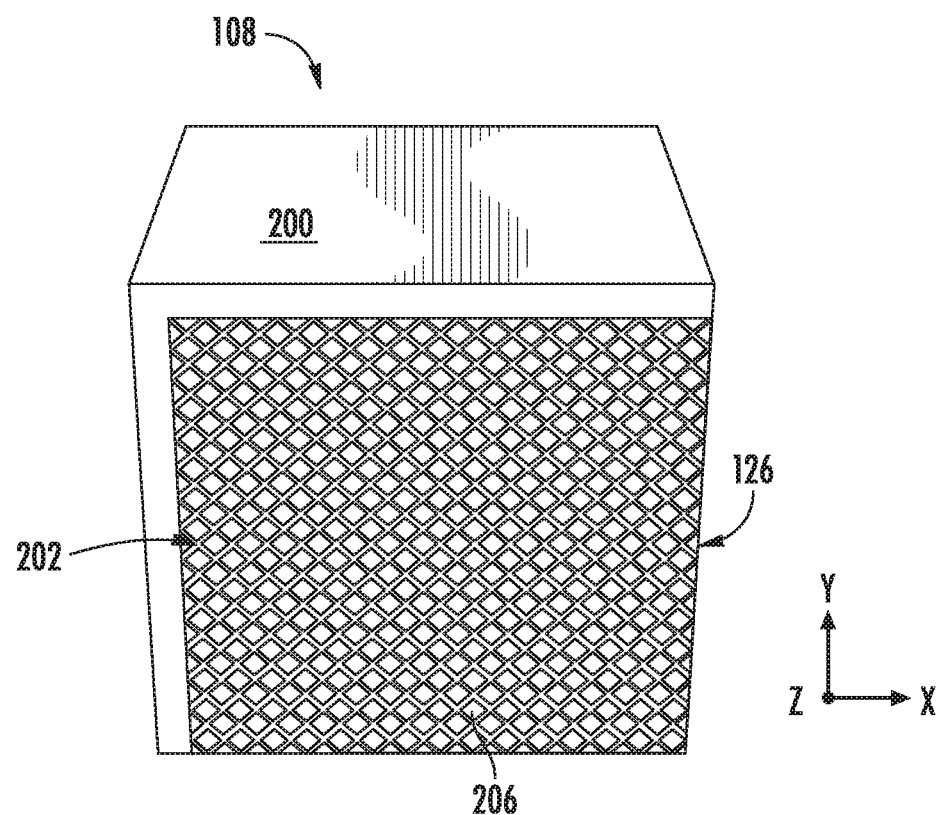
FIG. 2 illustrates a cross-sectional view of one embodiment of a component and a support structure according to the present disclosure.

Referring now to FIG. 2, a cross-sectional view of one embodiment of the component 108 with the support structure 126 securing the component 108 to the build platform 118 according to the present disclosure is illustrated. The component 108 may be oriented with reference to a Cartesian coordinate system having an X-axis, a Y-axis, and a Z-axis in which the X-axis and Y-axis define a plane that is generally parallel with the build platform 118, and a Z-axis defines an elevation or height of the component 108 relative to the build platform 118. As shown, the component 108 includes a component body 200 and the support structure 126 includes a plurality of support members 202, with both the component body 200 and the support members 202 having been formed by melting or sintering powder 104 in a PBF process such as DMLM, EBM, SLM, DMLS, or SLS. More specifically, as shown in FIGS. 2 and 4E, the support structure 126 has a lattice configuration having of a plurality of support members 202 arranged together to form a plurality of cells 206. As such, the support members 202 may be melted or fused to the build platform 118 so as to provide a secure connection between the support members 202 and the build platform 118. Further, the component body 200 may be melted or fused to the support members 202 so as to provide a secure connection between the component body 200 and the support members 202.

Figure 3:
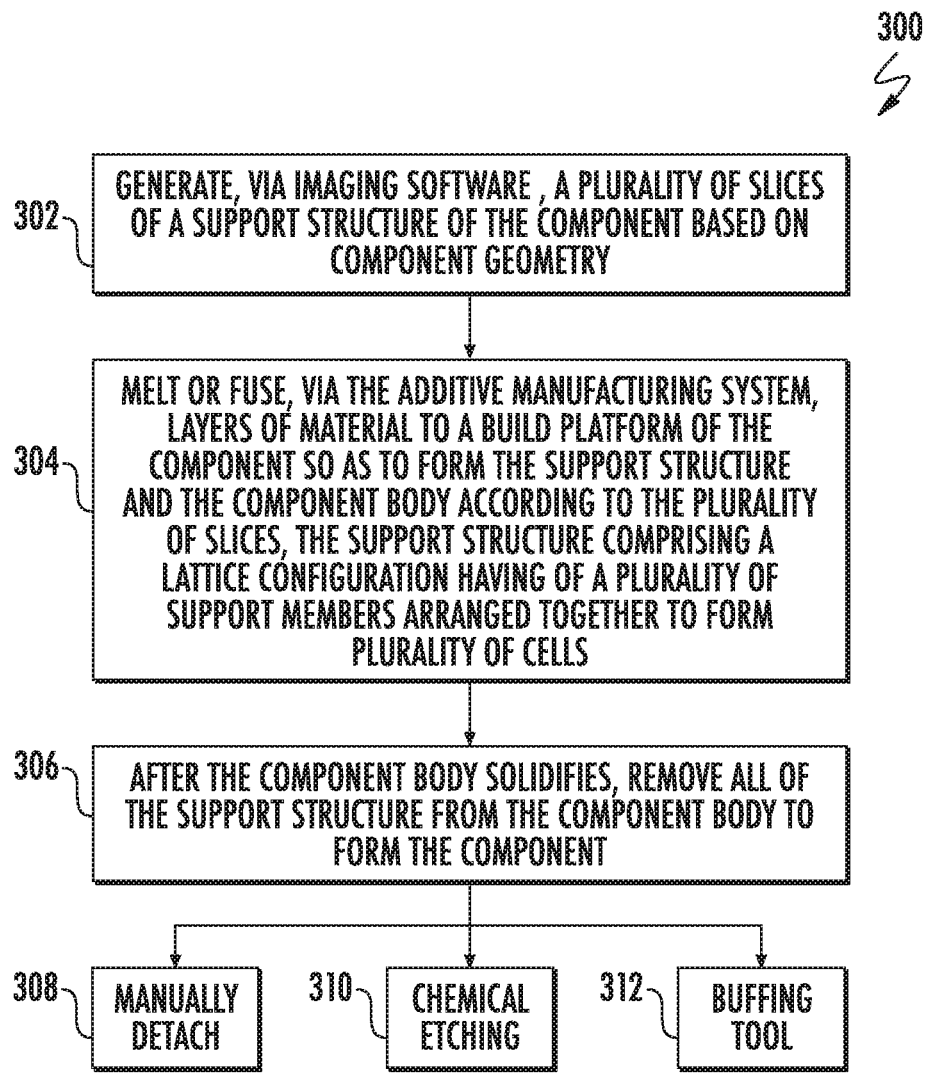
FIG. 3 illustrates a flow chart of one embodiment of a method for additively manufacturing a component according to the present disclosure.

Referring now to FIG. 3, a flow chart 300 of a method for additively manufacturing a component according to the present disclosure is illustrated. In general, the method 300 will be described herein with reference to the component 108 and additive manufacturing system 100 of FIGS. 1 and 2. However, it should be appreciated that the disclosed method 200 may be implemented with additive manufacturing systems having any other suitable configurations. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (302), the method 300 may include generating, via imaging software, a plurality of slices of the support structure 126 of the component 108 based on component geometry. In certain embodiments, for example, the imaging software may include polygon-based modeling software. In such embodiments, the polygon-based modeling software is configured to provide an improved modeling approach capable of designing very complex parts for additive manufacturing, such as heat exchangers and/or the lattice structures described herein. More specifically, in particular embodiments, polygon-based modeling directly generates slicing to feed the additive printer without explicitly creating intermediate 3-D geometry. As such, polygon-based modeling is more than 20 times faster than conventional modeling approaches and has an improved capacity to print complex parts.

Figure 4A:
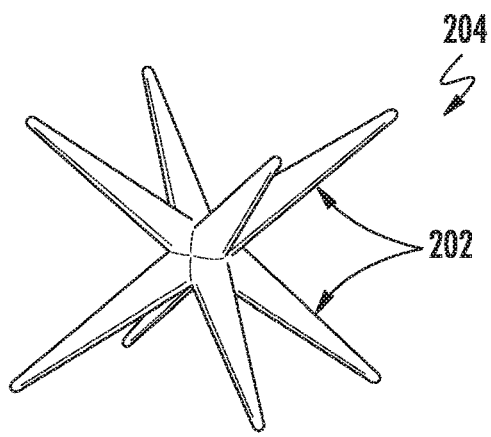
FIG. 4A illustrates a partial, perspective view of one embodiment of a plurality of support members arranged in a lattice configuration according to the present disclosure.
Figure 4B:
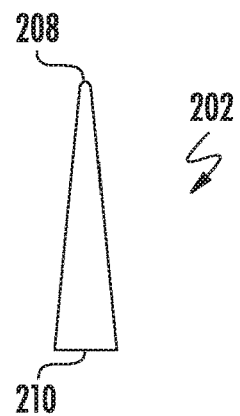
FIG. 4B illustrates a cross-sectional view of one embodiment of one of the support member according to the present disclosure.
Figure 4C:
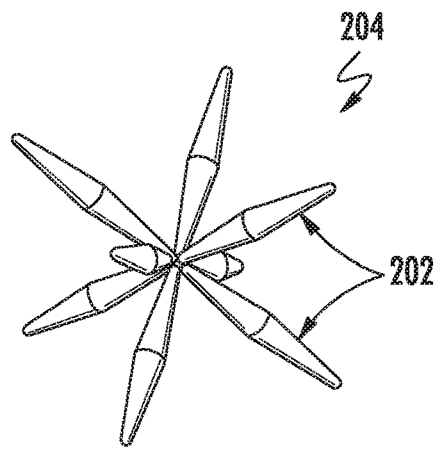
FIG. 4C illustrates a partial, perspective view of another embodiment of a plurality of support members arranged in a lattice configuration according to the present disclosure.
Figure 4D:
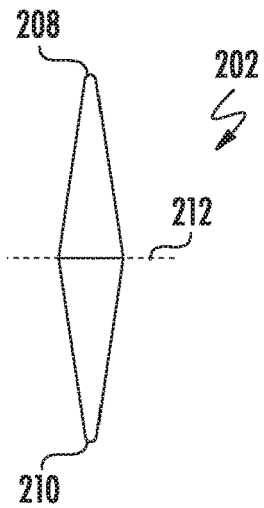
FIG. 4D illustrates a cross-sectional view of another embodiment of one of the support member according to the present disclosure.
Figure 4E:
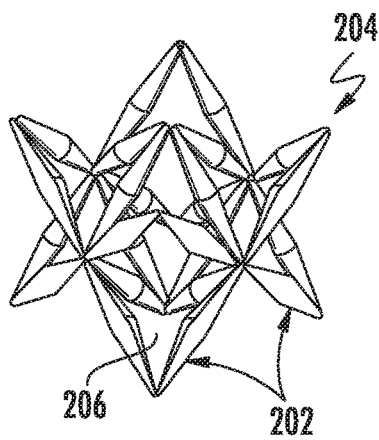
FIG. 4E illustrates a partial, perspective view of yet another embodiment of a support structure having a lattice configuration including a plurality of support members arranged together to form a plurality of cells according to the present disclosure.
Figure 5:
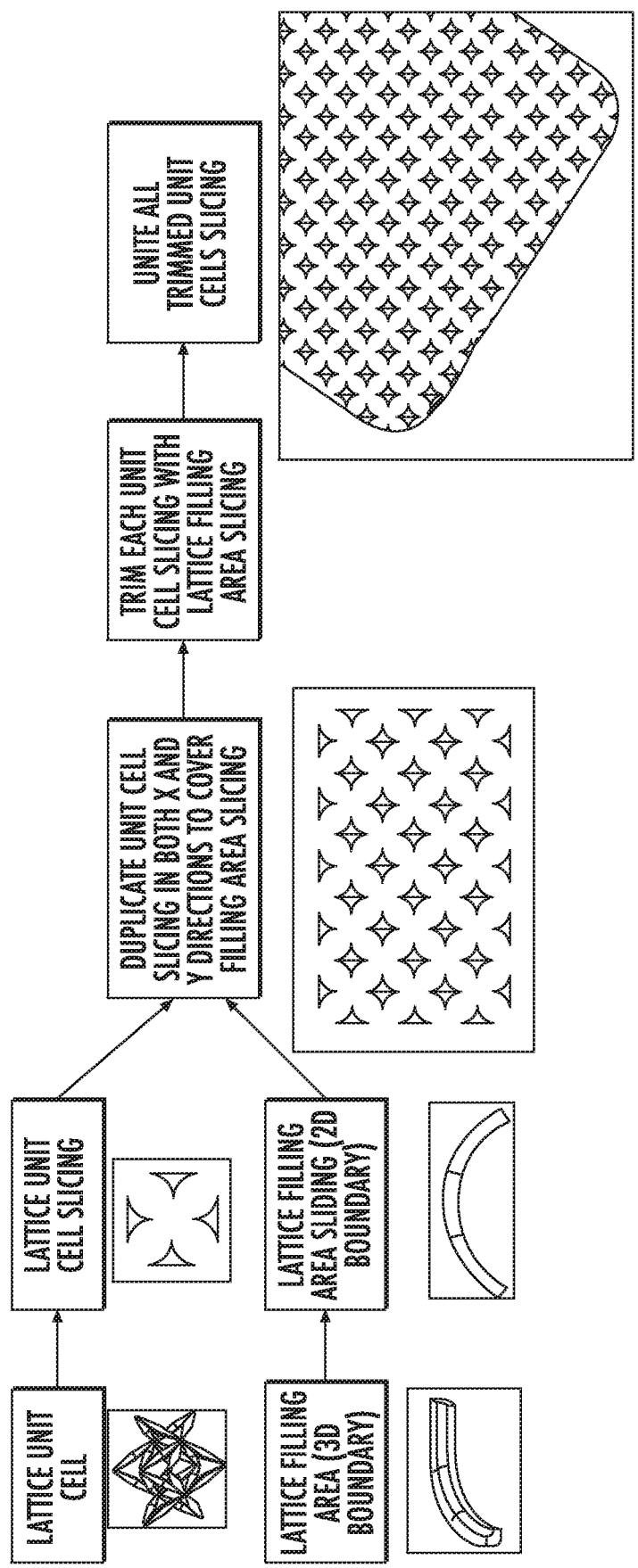
FIG. 5 illustrates a flow chart of one embodiment of a polygon-based imaging method for a lattice structure design according to the present disclosure.

More specifically, as shown in FIG. 5, the imaging software is configured to generate a plurality of two-dimensional (2-D) unit cell slices from a lattice configuration 206 of the support structure 126, such as the lattice configurations 204 illustrated in FIGS. 4A-4E. Thus, the plurality of slices 204 of the support structure 126 may include information regarding a number, diameter, and arrangement of the support members 202.

Referring still to FIG. 5, the imaging software is configured to duplicate the 2-D unit cell slices in X and Y directions to cover a fill area of the lattice configuration. In addition, as shown, the imaging software can then trim the 2-D unit cell slices by a boundary of the lattice configuration (e.g. as defined by the lattice filling area slicing polygons on each layer. Moreover, as shown, the imaging software combines the trimmed 2-D unit cell slices to form a final slicing of the lattice configuration (i.e. a series of layers that each contain multiple 2D polygons). In certain embodiments, an efficient 2-D polygon Boolean (trim, unite) algorithm may be developed to take advantage of the periodicity of the structure and generate slicing quickly. Further, the polygon-based modeling approach only needs to store one or a few slices of the entire structure in memory, thus, it can handle large lattice structures. Thus, the imaging software can directly feed a plurality of the final slices to the additive manufacturing system without generating an intermediate 3-D geometry of the support structure. As such, the polygon-based modeling method bypasses explicit 3-D geometry creation and directly generates final slicing by performing 2-D geometry operations (e.g. copy, pattern, unite, trim, etc.) on component slicing polygons.

After the slicing is completed, the additive manufacturing system 100 can then be begin the printing process. More specifically, in some embodiments, the additive manufacturing process may include powder bed fusion (PBF). As examples, the additive manufacturing process may include direct metal laser melting (DMLM), electron beam melting (EBM), selective laser melting (SLM), directed metal laser sintering (DMLS), and/or selective laser sintering (SLS). As such, the support structure 126 and/or the component body 200 may be formed using a powder 104, such as a powder 104 that includes a metal or metal alloy, a plastic, a ceramic, and/or a composite. As examples, a metal or metal alloy powder may include tungsten, aluminum, chromium, copper, cobalt, molybdenum, tantalum, titanium, nickel, and steel, and combinations thereof, as well as superalloys, such as austenitic nickel-chromium-based superalloys.

More specifically, referring back to FIG. 3, as shown at (304), the method 300 may include melting or fusing, via the additive manufacturing system 100, layers of material (such as the powder 104) to the build platform 118 of the component 108 so as to form the support structure 126 and the component body 200 according to the plurality of slices. As mentioned and as shown in FIGS. 2 and 4E, the support structure 126 may have a lattice configuration constructed of the support members 202 arranged together to form the plurality of cells 206. As such, it should be understood that any number of support members 202 may be included in the support structure 126. For example, as shown in FIGS. 4A-4E, each cell 204 may contain four support members 202. Alternatively, each cell 204 may contain any suitable number of support members 202 including more than four support members 202 and less than four support members 202. Accordingly, the number of support members 202 shown is provided by way of example only and not to be limiting.

In addition, in some embodiments, the support members 202 may have any suitable shape including, for example, a cylindrical shape, a conical shape, a tapered shape, and/or combinations thereof. As such, the support members 202 may have a cross-sectional profile corresponding to any polyhedral shape, including circular, semi-circular, oval, rectangular, polyhedral, or combinations of these. Further, the portions of the support members 202 contacting the component body 200 may have thinner cross-sections than non-contacting portions. In addition, in certain embodiments, a diameter of the support members 202 may be at least about 1.5 millimeters (mm). In further embodiments, it should be understood that the support members 202 may have any suitable dimensions including dimensions less than and greater than 1.5 mm, such as from about 0.2 mm to about 1.25 mm.

More specifically, in certain embodiments, as shown in FIGS. 4A and 4B, a support member 202 may have a tapered shape from one end to the other, i.e. a maximum diameter is at a first end 208 that tapers to a minimum diameter at an opposing, second end 210. As shown in FIGS. 4C and 4D, a support member 202 may have a tapered shape with a maximum diameter being at a center 212 of the support member 202 that tapers to respective minimum diameters at each of the first and second ends 208, 210. It should be understood that the cross-sections shown in FIGS. 4A-4E are provided by way of example and are not to be limiting. It will be appreciated that a support structure 126 may include support members 202 with any desired cross-section.

Moreover, the cells 206 described herein may include multiple shapes and/or sizes. For example, in one embodiment, a dimension (e.g. a height, a width, or a length thereof) of the plurality of cells 206 may be at least about 0.5 mm. In further embodiments, it should be understood that the cells 206 may have any suitable dimensions including dimensions less than and greater than 0.5 mm. Accordingly, the cells 206 of the present disclosure are configured to provide a pathway for cleaning out unused powder 104 during post-fabrication processes. Additionally, the cells 206 may interrupt or isolate residual stresses in the support structure 126 caused by rapid changes in temperature during the additive manufacturing process.

After the support structure 126 and the component body 200 solidify, as shown at (306), the method 300 may include removing all of the support structure 126 from the component body 200 to form the component 108. For example, in certain instances, the support members 202 may contact the component body 200 only at a plurality of nodes (i.e. the interface between the thin ends of the support members 202 and the component body 200. In such embodiments, the method 300 may include removing the support structure 126 from the component body 200 by simply detaching ends of the support members 202 from the component body 200 at the plurality of nodes.

More specifically, as shown at (308), removing all of the support structure 126 from the component body 200 may include manually detaching the portions of the support members 202 that are contacting the component body 200 from the component 108. Alternatively, as shown at (310), removing all of the support structure 126 from the component body 200 may include detaching the portions of the support members 202 that are contacting the component body 200 via chemical etching. In such embodiments, chemical etching may be used to erode away the support members 202 from the component body 200. In further embodiments, a diameter at a contacting end of the support members 202 may be equal to about 1.5 times a chemical etching target, such as about 2 times the chemical etching target, so as to completely erase/erode the support structure 126.

In yet another embodiment, as shown at (312), removing all of the support structure 126 from the component body 200 may include detaching the portions of the support members 202 that are contacting the component body 200 from the component body 200 via a buffing tool. In such embodiments, the method 300 may include simultaneously polishing surfaces of the component body 200 via the buffing tool during detaching.

The various components 108 described herein and their respective support structures 126 may be formed according to the present disclosure using any desired materials compatible with a PBF system. Example materials may include metals and metal alloys, such as metals or metal alloys that include tungsten, aluminum, chromium, copper, cobalt, molybdenum, tantalum, titanium, nickel, steel, and combinations thereof, as well as superalloys, such as austenitic nickel-chromium-based superalloys. Further exemplary materials include plastics, ceramics and composite materials.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for additively manufacturing a component, the method comprising:
   generating, via imaging software, a plurality of slices of a support structure of the component based on component geometry, wherein the generating further comprises:
      generating a plurality of two-dimensional (2-D) unit cell slices of a lattice configuration of the support structure;
      duplicating the 2-D unit cell slices in X and Y directions to cover a fill area of the lattice configuration;
      trimming the 2-D unit cell slices by a boundary of the lattice configuration;
      combining the trimmed 2-D unit cell slices to form a final slice of the lattice configuration; and
      directly feeding a plurality of final slices to an additive manufacturing system prior to generating a three-dimensional (3-D) geometry of the support structure;
   melting or fusing, via the additive manufacturing system, layers of material to a build platform of the component so as to form the support structure and a component body according to the plurality of slices of the support structure, the support structure comprising the lattice configuration having a plurality of support members arranged together to form a plurality of cells; and
   after the support structure and the component body solidify, removing all of the support structure from the component body to form the component.

2. The method of claim 1, wherein the imaging software comprises polygon-based modeling software and the plurality of slices of the support structure comprise information regarding a number, diameter, and arrangement of the plurality of support members of the support structure.

3. The method of claim 1, wherein a diameter at an end of the plurality of support members is at least about 1.5 millimeters (mm).

4. The method of claim 1, wherein a dimension of the plurality of cells is at least about 0.5 mm, the dimension comprising at least one of a height, a width, or a length.

5. The method of claim 1, wherein portions of the plurality of support members contacting the component body comprise thinner cross-sections than non-contacting portions.

6. The method of claim 5, wherein the plurality of support members contact the component body only at a plurality of nodes, and wherein removing all of the support structure from the component body to form the component further comprises detaching the plurality of support members from the component body at the plurality of nodes.

7. The method of claim 6, further comprising detaching the portions of the plurality of support members that are contacting the component body from the component body via chemical etching.

8. The method of claim 6, further comprising detaching the portions of the plurality of support members that are contacting the component body from the component body via a buffing tool.

9. The method of claim 8, further comprising simultaneously polishing surfaces of the component body via the buffing tool during detaching.

10. The method of claim 1, wherein removing all of the support structure from the component body to form the component further comprises eroding away the plurality of support members from the component body via chemical etching.

11. A method for additively manufacturing a component, the method comprising:
forming, via an additive manufacturing system, a support structure and a component body of the component on a build platform of the component, the support structure comprising a lattice configuration having a plurality of support members arranged together to form a plurality of cells, wherein the support structure is formed by:
generating a plurality of two-dimensional (2-D) unit cell slices of a lattice configuration of the support structure;
duplicating the 2-D unit cell slices in X and Y directions to cover a fill area of the lattice configuration;
trimming the 2-D unit cell slices by a boundary of the lattice configuration;
combining the trimmed 2-D unit cell slices to form a final slice of the lattice configuration; and
directly feeding a plurality of final slices to the additive manufacturing system prior to generating a three-dimensional (3-D) geometry of the support structure; and
after the support structure and the component body solidify, detaching the support structure from the component body via chemical etching.

12. The method of claim 11, wherein portions of the plurality of support members contacting the component body comprise thinner cross-sections than non-contacting portions.

13. The method of claim 11, wherein detaching the plurality of support members from the component body via chemical etching further comprises eroding away the plurality of support members from the component body via chemical etching.

14. The method of claim 11, further comprising forming the support structure and/or the component body using a powder, the powder comprising a metal or metal alloy, a plastic, a ceramic, and/or a composite.

15. The method of claim 11, wherein the additive manufacturing system comprises a powder bed fusion (PBF) system.

* * * * *